United States Patent
Nagle, II et al.

(10) Patent No.: US 8,405,837 B2
(45) Date of Patent: Mar. 26, 2013

(54) SYSTEM AND METHOD FOR INSPECTING SURFACES USING OPTICAL WAVELENGTH FILTERING

(75) Inventors: John Anthony Nagle, II, Cedar Park, TX (US); Christopher M. Villar, Liberty Hill, TX (US); Steven C. Orrell, Georgetown, TX (US); Charles Wayne Aaron, Salado, TX (US)

(73) Assignee: Georgetown Rail Equipment Company, Georgetown, TX (US)

( * ) Notice: Subject to any disclaimer, the term of this patent is extended or adjusted under 35 U.S.C. 154(b) by 670 days.

(21) Appl. No.: 12/465,473

(22) Filed: May 13, 2009

(65) Prior Publication Data

US 2009/0273788 A1   Nov. 5, 2009

Related U.S. Application Data

(63) Continuation-in-part of application No. 11/172,618, filed on Jun. 30, 2005, now Pat. No. 7,616,329.

(60) Provisional application No. 60/584,769, filed on Jun. 30, 2004.

(51) Int. Cl.
   *G01B 11/14* (2006.01)
(52) U.S. Cl. ........................................ 356/625
(58) Field of Classification Search ............... None
   See application file for complete search history.

(56) References Cited

U.S. PATENT DOCUMENTS

| | | | | |
|---|---|---|---|---|
| 4,265,545 A | | 5/1981 | Slaker | 356/43.1 |
| 4,700,223 A | * | 10/1987 | Shoutaro et al. | 356/606 |
| 4,915,504 A | * | 4/1990 | Thurston | 356/604 |
| 6,025,920 A | * | 2/2000 | Dec | 356/438 |
| 6,615,648 B1 | | 9/2003 | Ferguson et al. | 73/146 |
| 6,647,891 B2 | * | 11/2003 | Holmes et al. | 356/602 |
| 2002/0196456 A1 | * | 12/2002 | Komiya et al. | 358/1.9 |
| 2003/0140509 A1 | | 7/2003 | Casagrande | |
| 2004/0088891 A1 | | 5/2004 | Theurer | |
| 2004/0122569 A1 | | 6/2004 | Bidaud | |
| 2006/0017911 A1 | | 1/2006 | Villar et al. | 356/4.01 |
| 2006/0171704 A1 | | 8/2006 | Bingle et al. | 396/419 |

FOREIGN PATENT DOCUMENTS

| | | |
|---|---|---|
| DE | 10040139 | 3/2003 |
| FR | 2674809 | 10/1992 |
| JP | 2000221146 | 8/2000 |
| RU | 1418105 | 8/1988 |
| RU | 2142892 | 12/1999 |

OTHER PUBLICATIONS

Decision on Grant, dated Oct. 22, 2009, for corresponding Russian patent application No. 2007103331.
PCT International Search Report and Written Opinion dated Apr. 19, 2010 for corresponding PCT/US2010/023991.
Supplementary Search Report for European Application No. EP 05767776.7 dated May 2, 2011.

* cited by examiner

*Primary Examiner* — Kara E Geisel
*Assistant Examiner* — Juan D Valentin, II
(74) *Attorney, Agent, or Firm* — Parsons Behle & Latimer

(57) ABSTRACT

A system and method for daylight inspection of a surface, such as a railroad track, is disclosed. The disclosed system includes lasers, cameras, and a processor. The lasers are positioned adjacent the surface. The laser emits a beam of light across the surface at a combined intensity of at least 0.15 watts of intensity per inch of width of the surface, and the camera captures images of the surface having the beam of light emitted thereon. The camera includes a bandpass filter which passes only a band of light corresponding to a dip in solar radiation. The laser is selected to provide an emitted light beam which is more intense than the solar radiation at the dip. The processor formats the images so that they can be analyzed to determine various measurable aspects of the surface. The system and method includes one or more algorithms for determining these measurable aspects of the surface.

23 Claims, 11 Drawing Sheets

SYSTEM AND METHOD FOR INSPECTING SURFACES USING OPTICAL WAVELENGTH FILTERING

CROSS REFERENCE TO RELATED APPLICATIONS

This application is a continuation-in-part of U.S. application Ser. No. 11/172,618, entitled, "SYSTEM AND METHOD FOR INSPECTING RAILROAD TRACK, filed Jun. 30, 2005 now U.S. Pat. No. 7,616,329 and naming John Nagle, Christopher Villar and Steven Orrell as inventors, which is a non-provisional application claiming benefit of U.S. Provisional Application Ser. No. 60/584,769, also entitled, "SYSTEM AND METHOD FOR INSPECTING RAILROAD TRACK, filed Jun. 30, 2004, naming John Nagle and Steven C. Orrell as inventors, each being hereby incorporated by reference in their entirety.

FIELD OF THE INVENTION

The present invention relates generally to systems and methods for inspecting surfaces and, more particularly to systems and methods for daylight inspection of surfaces, such as railroad surfaces or roads, for example, using wavelength filtering.

BACKGROUND OF THE INVENTION

Railroads are generally constructed on a base layer of compacted, crushed stone material. A layer of gravel ballast rests on top of this stone layer. Crossties are laid in and on this ballast layer, and two parallel steel rails are attached to the crossties with fasteners. The majority of crossties in service are made of wood. Various other materials are used such as concrete, steel, and composite or recycled material in the manufacture of crossties. These alternative material crossties make up a relatively small percentage of all crossties. The crossties maintain the gage or lateral spacing of the rails. The crossties distribute the axle loads from the trains to the ballast layer below the crossties and contribute to the cushioning effect of the entire track structure. Over time, environmental factors can cause the crossties to deteriorate until they must be replaced. Annually, railroads in North America replace up to 2% or more of all wooden crossties. This constitutes several million crossties.

To manage the logistics of crosstie replacement and to quantify the need for new crossties, railroad inspectors attempt to grade the condition of crossties and the fastener system on a regular basis. This grading is most often done with a visual inspection to identify crossties and fasteners that are rotten, broken, split, or worn to an extent that their serviceable life is at its end. The process of visual inspection is quite time consuming. In practice, inspection of the track is performed by an inspector walking along the track to inspect and record the conditions of the crosstie and/or fasteners, which are spaced approximately every 20-inches along the track. One particular North American railroad reports that a crew of 3 or 4 men can grade only about 5 to 7 miles of track per day.

Devices for inspecting rail are known in the art, and software for analyzing and organizing data obtained with such devices is known in the art. For example, TieInspect® by ZETA-TECH Associates, Inc. of New Jersey is a computerized crosstie inspection system having a hand held device and software. The hand held device is used by inspectors when walking along the track and surveying the track, and the software is used to analyze and organize the data obtained with the device.

In addition to the grading of crossties, other track components must be periodically inspected for wear and deterioration. These include wear on the riding surface of the rail, integrity of anchors and fasteners, alignment of the tie plates, condition of the ballast, and gage of the rail. As with the grading of crossties, inspecting these aspects of rail can also be time consuming. Systems are known in the art for inspecting rails. For example, OmniSurveyor3D® by Omnicom Engineering of the United Kingdom is a system for surveying the infrastructure on railways. Also, ENSCO, Inc. of Minnesota provides a Laser Gage Measurement System for measuring the gage of rail using lasers.

One of the problems with laser measurement systems is that the lasers are difficult to detect in the daylight. While laser light is easy to detect at night when there are few other competing light sources, intervention is required in order to operate the lasers during daylight for the purposes of data collection of various surfaces.

The present invention is directed to overcoming, or at least reducing the effects of, one or more of the problems set forth above, thereby providing a system capable of inspecting surfaces during both night and day.

SUMMARY OF THE DISCLOSURE

Exemplary systems and methods for daylight inspection of a surface, such as a railroad track, are disclosed. The disclosed system includes lasers, cameras, and a processor. In an exemplary embodiment, a center and two outer lasers are positioned adjacent the surface. The two outer lasers are tilted outwardly from the center laser at a 10 degree angle. The lasers emit a beam of light across the surface for a combined intensity of at least 0.15 watts of intensity per inch of width of the surface, and the camera captures images of the surface having the beam of light emitted thereon. The camera includes a bandpass filter which passes only a band of light corresponding to a dip in solar radiation. The lasers are selected to provide an emitted light beam at the wavelength of the dip that is more intense than the solar radiation at that same wavelength. The processor formats the images so that they can be analyzed to determine various measurable aspects of the surface. The exemplary systems and methods include one or more algorithms for determining these measurable aspects of the surface.

The foregoing summary is not intended to summarize each potential embodiment or every aspect of the subject matter of the present disclosure.

BRIEF DESCRIPTION OF THE DRAWINGS

The foregoing summary, preferred embodiments, and other aspects of the subject matter of the present disclosure will be best understood with reference to a detailed description of specific embodiments, which follows, when read in conjunction with the accompanying drawings, in which.

Figure 1:
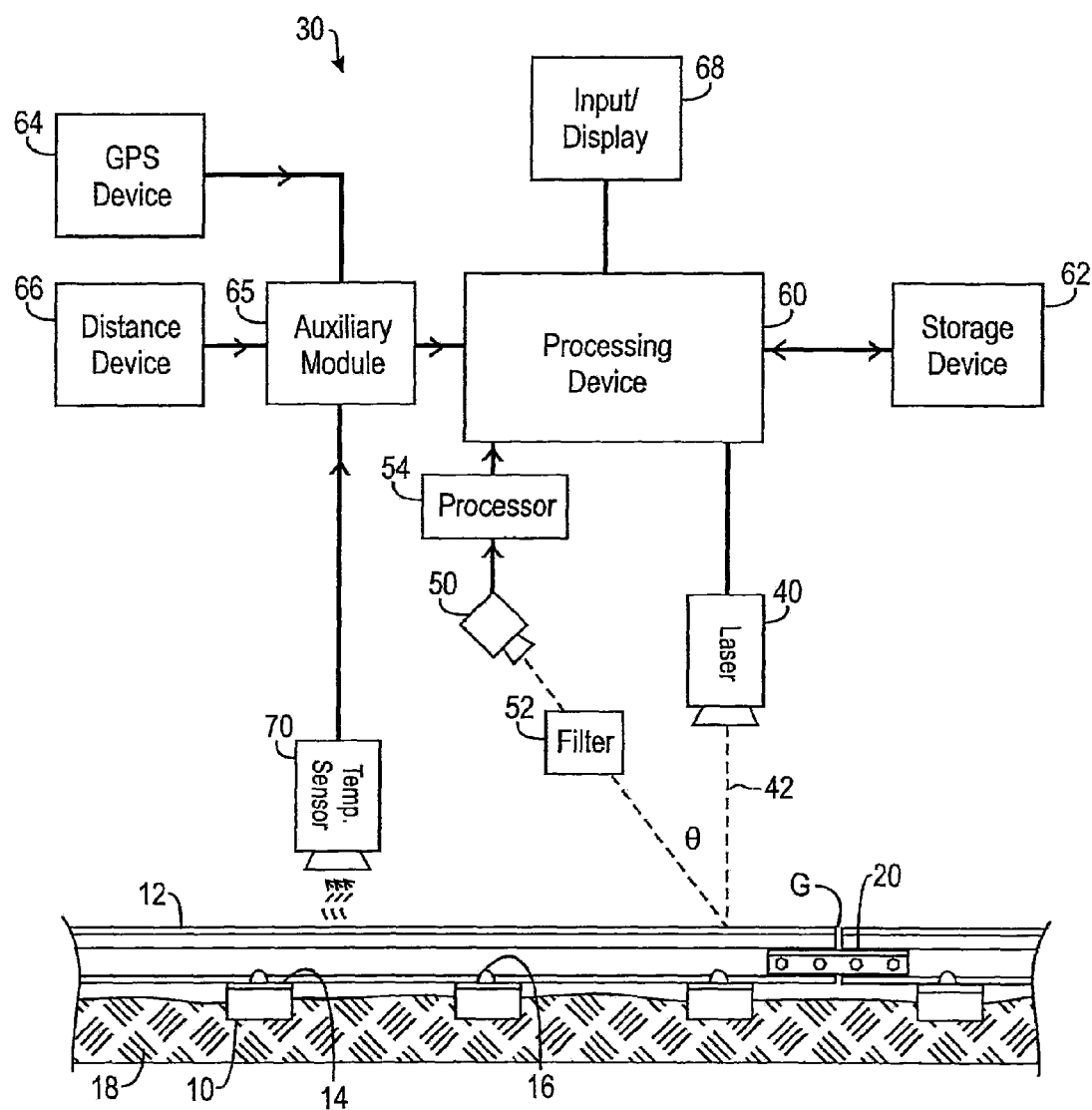
FIG. 1 schematically illustrates an embodiment of the disclosed inspection system.

While the disclosed inspection system and associated methods are susceptible to various modifications and alternative forms, specific embodiments thereof have been shown by way of example in the drawings and are herein described in detail. The figures and written description are not intended to limit the scope of the disclosed inventive concepts in any manner. Rather, the figures and written description are provided to illustrate the disclosed inventive concepts to a person skilled in the art by reference to particular embodiments, as required by 35 U.S.C. §112.

DETAILED DESCRIPTION OF ILLUSTRATIVE EMBODIMENTS

Figure 2:
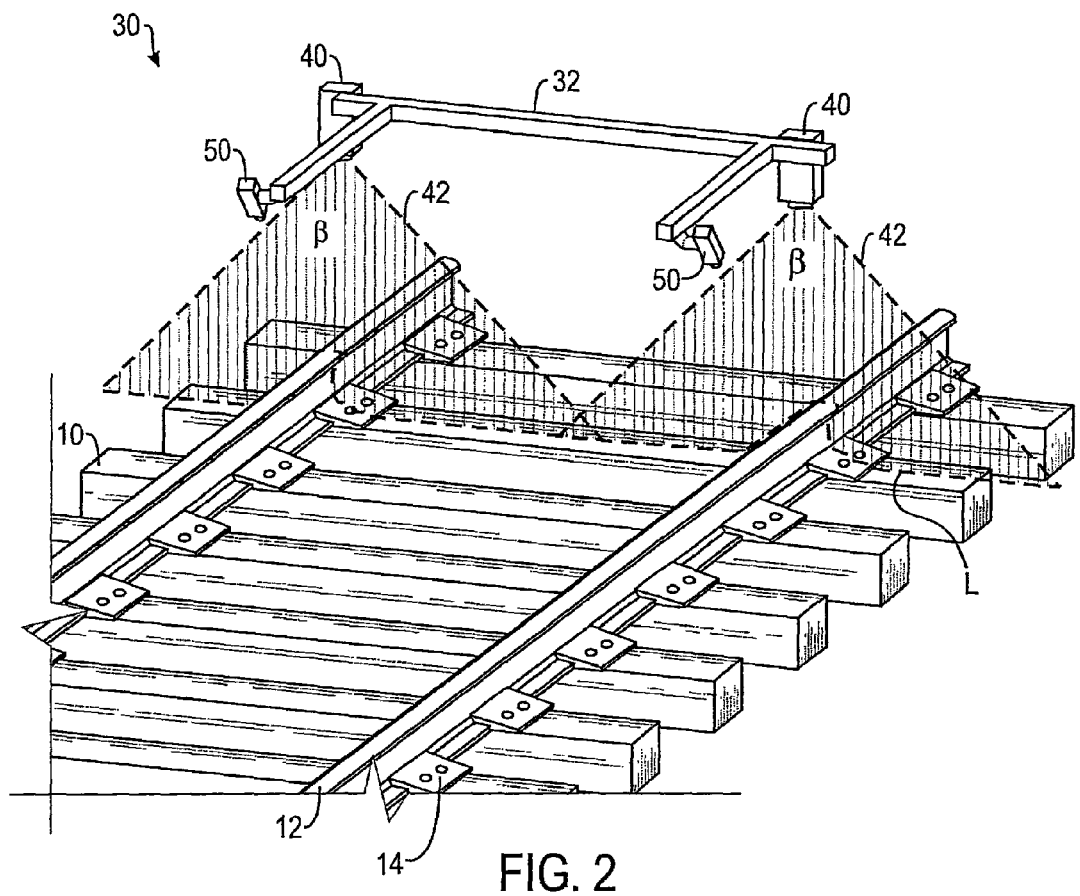
FIG. 2 illustrates a portion of an embodiment of a system for inspecting railroad track according to certain teachings of the present disclosure.

Referring to FIGS. 1 and 2, an exemplary embodiment of a system 30 for inspecting railroad track according to certain teachings of the present disclosure is illustrated. In FIG. 1, the disclosed inspection system 30 is schematically illustrated relative to a railroad track. In FIG. 2, a portion of the disclosed inspection system 30 is illustrated in a perspective view relative to railroad track.

As best shown in FIG. 1, the exemplary disclosed inspection system 30 includes a light generator such as a laser 40, a device for receiving light reflected from the area to be inspected such as a camera 50, and a processing device 60. In the implementation shown in FIG. 1, the disclosed inspection system 30 is used to survey the track bed of a railroad track. Although the disclosed inspection system and associated methods are described for use in inspecting railroad track, it will be appreciated with the benefit of the present disclosure that the disclosed system and method can be used in other areas and in industries where surfaces or components require inspection. For example, the disclosed inspection system and method can be used to inspect roads, electrical lines, piping, or other networks or systems.

The track bed includes crossties 10, rails 12, tie plates 14, spikes 16, and ballast 18. Briefly, the laser 40 projects a beam 42 of laser light at the track bed. The beam 42 produces a projected line L, shown in FIG. 2, on the track bed that follows the contours of the surfaces and components of the track bed. The light receiver, camera 50, captures an image of the line L of laser light 42 projected on the track bed. The camera 50 sends the captured image to the processing device 60 for processing and analysis as described in more detail below.

As best shown in exemplary embodiment of FIG. 2, pairs of lasers 40 and cameras 50 are positioned above each one of the rails 12 of the track. The lasers 40 and the cameras 50 can be assembled onto a rigid framework 32, which can be mounted on an inspection vehicle (not shown) or other device moving along the track so as to maintain the inspection system 30 in the proper position. Only a portion of the framework 32 is shown in FIG. 2 for simplicity. However, it is understood that other known components for the framework 32 may be needed to mount the lasers 40 and the cameras 50 on an inspection vehicle.

In general, the inspection vehicle can be any suitable vehicle for traveling along the railroad track. For example, a common practice in the art is to equip a normal highway vehicle, such as a pick-up truck, with "hi-rail" gear mounted to the frame of the vehicle. Hi-rail gear typically includes a set of undersized railroad stock wheels that allow the highway vehicle to ride along the rails. In one embodiment, then, the framework 32 of the disclosed inspection system 30 can be mounted in the bed of a pick-up truck having "hi-rail" gear. Alternatively, the inspection vehicle can be maintenance of way (MoW) equipment that is specifically designed for working along the railroad track. In addition, the disclosed inspection system 30 can be mounted on a chassis that is towed by a vehicle or can be mounted on a locomotive or freight car.

As best shown in FIG. 2, the lasers 40 project a beam 42 of light having a predetermined angular spread $\beta$. The angular spreads $\beta$ of the two lasers 40 cover substantially the entire surface of the track bed. In this way, the lasers 40 produce a projected line L that is substantially straight and extends substantially across the track bed. Each laser 40 preferably produces a beam 42 having an angular spread $\beta$ of about 60-degrees and covers approximately one half of the track bed. Preferably, the lasers 40 project the beam 42 substantially perpendicular to the surface of the track. Alternatively, a single laser could be used that is positioned such as to create the projected line L across the track bed.

In addition, the lasers 40 are preferably infrared lasers having 4-watts of optical output and producing light at an infrared wavelength of about 810-nm. The relatively high optical output of the lasers 40 helps reduce effects of ambient light so that shielding is not necessary. A suitable laser for the disclosed inspection system 30 includes a Magnum laser manufactured by Stocker Yale. The parameters described above for the lasers 40 are preferred for inspecting the surface of a railroad track. However, those ordinarily skilled in the art having the benefit of this disclosure realize the present is invention may be utilized to inspect a variety of other surfaces. Other implementations of the disclosed inspection system 30 can use an alternate number of light sources as well as different wavelengths, optical outputs, and angular spreads.

As best shown in FIG. 2, the cameras 50 are positioned adjacent the lasers 40. As best shown in FIG. 1, the cameras 50 are mounted at an angle $\theta$ with respect to the beam 42 of light projected from the lasers 40. In one embodiment, the cameras are positioned at an angle $\theta$ of about 60-degrees. As the disclosed inspection system 30 is moved along the track, the cameras 50 capture an image or frame of the track bed at small, regular increments. Preferably, the cameras 50 are capable of a substantially high frame rate, such as about 5405 frames per second.

Each still image or frame captured by the cameras 50 is then filtered and processed to isolate the contoured laser line L projected on the track bed. The cameras 50 are fitted with band-pass filters 52 that allow only the radiant energy substantially at the preferred infrared wavelength of the lasers 40 to pass. Because the wavelength of the lasers 40 is about 810-nm, the band-pass filters 52 of the cameras 50 can eliminate substantially all ambient light so that the camera 50 acquires a substantially clear, still image of the projected line L of light from the lasers 40.

Each of the two cameras 50 send image data directly to the processing device or computer 60 via wired or wireless transmission lines. Preferably, the camera 50 includes a processor 54 capable of converting or formatting the captured image of the projected line L into a dimensional profile that is sent directly to the processing device or computer 60. The ability of the camera 50 to process or format the captured image in this way can eliminate the need for expensive post processors or high-speed frame grabbers. A suitable camera for the disclosed inspection system 30 having such processing abilities includes a Ranger M50 manufactured by IVP Integrated Vision Products, Inc.

Among other common components, the processing device or computer 60 includes a microprocessor, inputs, outputs, and a data storage device 62. The data storage device 62 can include a hard drive, a non-volatile storage medium, a flash memory, tape, or CD-ROM. The processing device 60 can further include an input/display 68 for a track inspector to input and review data and to operate the disclosed inspection system 30. The processing device 60 operates with suitable software programs for storing and analyzing the various data obtained with the disclosed inspection system 30. For example, the processing device 60 can have any suitable image processing software, such as Matrox MIL, Common VisionBlox, Labview, eVision, Halcon, and IVP Ranger. For example, the processing device 60 can have image processing tools known in the art for analyzing image data from the cameras 50 such as Region of Interest (ROI) tools, filtering tools, blob tools, edge finders, histogram tools, and others.

To effectively process all of the data obtained with the disclosed inspection system 30, the processing device 60 in a preferred embodiment includes a computer having a fast processor, such as an Intel Pentium 4 processor capable of running at 2.8 GHz. To effectively store all of the data obtained with the disclosed inspection system 30, the storage device 62 preferably includes two large-capacity hard drives configured to use both read/write mechanisms simultaneously as one drive, which is also known as a Redundant Array of Independent Disks (RAID) system. The fast processor of the processing device 60 and the dual hard drives of the storage device 62 allow for sustained real-time storage of the data obtained with the disclosed inspection system 30. In a preferred embodiment, the power for the disclosed inspection system 30 can be provided by 110 V AC power from a belt driven generator running directly off the engine of the inspection vehicle.

Figure 3:
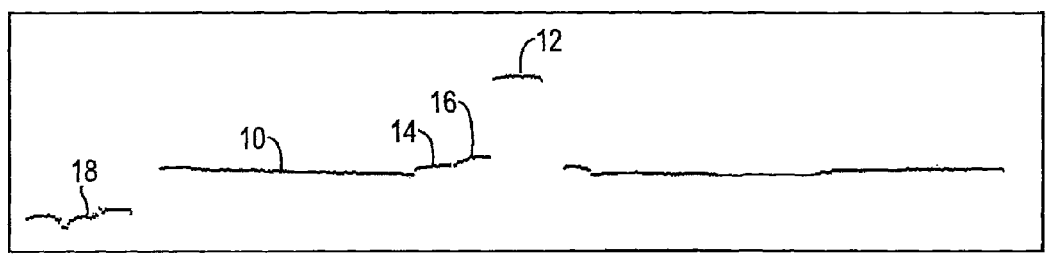
FIG. 3 illustrates an example frame of a portion of railroad track obtained with the disclosed inspection system.

With the beams 42 projected onto the irregular surface of the track and viewed at an angle, the projected line L shown in FIG. 2 follows the contours of the surface and components of the track bed. An example image or frame showing the projected line L of the track bed is shown in FIG. 3. The image data or frame includes a plurality of pixels given X-Y coordinates and shows a contour of the track bed captured by the cameras 50. Due to filtering and other image processing techniques known in the art, the image includes two pixel values, where the dark pixels represent the contour of the track bed. Every pixel of a given image data is given the same Z-coordinate, which represents the particular position along the length of the track at which the image data was captured. In this manner, a plurality of captured images produce a three-dimensional scan of the track bed in which each image of the scan has X-Y coordinates showing the contour of the track bed and has a Z-coordinate representing the particular position of the contour along the length of rail.

It is understood that the speed at which an image is captured is limited by the width and height of the scanned area, the distance between the discrete still images, the resolution of the still images, the maximum frame rate of the cameras 50, the processing speed of the computer 60, and the write speed of the data storage device 62. For a railroad application of the disclosed inspection system 30, one preferred example is spacing between still images or frames captured by the cameras 50 of about 0.1-inch, a preferred velocity of the inspection vehicle of about 30-mph, a preferred height of the scanned area of approximately 10 inches, and a preferred width of the scanned area of about 10-feet across the width of the track bed. To satisfy these preferred parameters, a camera system capable of about 5405 frames per second and a computer system capable of processing and recording at about 8.3 MPS is preferred. Each frame or image, such as shown in FIG. 3, may require about 1,536 bytes of storage. With a frame captured at about every 0.1-inches along the length of track, about 633,600 frames would be captured for one mile of track and would require 0.973 gigabytes of storage space.

Another embodiment and as shown in FIG. 1, the disclosed inspection system 30 may further include a Global Position System (GPS) receiver 64 for obtaining geographical locations of the inspection vehicle when inspecting the railroad track. The GPS receiver 64 can include any suitable GPS receiver known in the art for obtaining geographical locations. For example, the GPS receiver 64 can be an independent, commercially available unit mounted on the inspection vehicle and connected to the processing device 60 with a suitable cable connection and input/output interface. The GPS receiver 64 can obtain the geographical location using a differential or non-differential GPS system. Techniques for obtaining substantially accurate location and time data with a GPS receiver 64 are well known in the art and are not discussed further. The geographical locations are sent to the processing device 60 and can be compiled with the image data of the track bed.

When the image data from the cameras 50 is recorded, the geographical location of the frame can also be recorded. Eliminating a continuous stream of geographical location data from the GPS receiver 64 to the computer 60 can free the processor time available for capturing the image data with the processing device 60. Therefore, the GPS receiver 64 preferably feeds data to an auxiliary module 65. The auxiliary module 65 packages this data and sends the data to the processing device or computer 60 when queried. In addition to obtaining geographical location data, the GPS receiver 64 can obtain time data. Furthermore, the location and time data obtained with the GPS receiver 64 can be used to determine other variables, such as the speed of the inspection vehicle, which can be used for various purposes disclosed herein. Thus, the disclosed inspection system 30 can use data from the GPS receiver 64 to trigger the cameras 50 to capture a still image of the track bed at about every 0.1-inches along the rail.

In an alternative exemplary embodiment and as shown in FIG. 1, the disclosed inspection system 30 can include a distance device 66 for obtaining geographical locations of the inspection vehicle when inspecting the rail. The distance device 66 can be an encoder that counts wheel revolutions or partial revolutions as the inspection vehicle moves along the rail or can be the existing odometer sensor on the inspection vehicle. The distance device 66 can provide location data to the processing device 60. Using the distance device 66, the disclosed inspection system 30 can trigger the cameras 50 to capture a still image of the track bed at about every 0.1-inches along the rail.

In another exemplary embodiment, the disclosed inspection system 30 can capture still images of the track bed at or near the maximum frame rate of the cameras 50 without being triggered by the GPS receiver 64 or distance device 66. For example, the cameras 50 and processing device 60 can operate at or near the maximum frame rate while the inspection vehicle travels along the track. Using the known average width of a crosstie 10 or tie plate 14, the disclosed inspection system 30 can calculate the velocity of the inspection vehicle. The disclosed system can then delete any extra frames to reduce data storage so that the retained frames would have an approximate spacing of 0.1-inch. It is understood that exact spacing of 0.1-inch may not always be possible, but the spacing will be known and may be between 0.05" and 0.1". In this embodiment, the same number of frames must be discarded between each retained frame on a given tie so that frame spacing remains uniform. For example, if the tie plates are known to be 8-inches wide and 244 frames are captured for a specific tie plate, then two frames can be discarded between each retained frame. If the entire set of frames were numbered 1 through 244, then the retained frames would be those numbered: 1, 4, 7, 10, . . . 241, 244. The retained 82 frames would have a calculated spacing of 0.098-inch.

Alternatively, the disclosed system could interpolate between any two captured frames to create a new third frame at any desired location along the track. Some frames could then be discarded to achieve the exact frame spacing desired.

After the disclosed inspection system 30 completes a survey of railroad track, computer analysis of the image data is performed. The computer analysis can be performed by the processing device or computer 60 located in the inspection vehicle. Alternatively, the computer analysis can be performed by another computer system having image processing software known in the art. The computer analysis searches the image data and determines or detects locations along the track where defects occur or where allowable tolerances of the railroad track are not maintained. For a particular implementation, the computer analysis can be customized or changed. The geographic locations of defects or unallowable tolerances can be provided so that appropriate repairs can be made or maintenance work can be scheduled.

A number of measurable aspects of the railroad track can be determined or detected from the image data of the track bed obtained with the disclosed inspection system and associated methods. In examples that follow, a number of such measurable aspects are discussed, and various techniques for analyzing the measurable aspects are disclosed. It will be appreciated that these and other measurable aspects of the railroad track can be determined or detected from the image data of the track bed obtained with the disclosed inspection system. In addition, it will be appreciated that other techniques known in the art for analyzing the image data can be used with the disclosed inspection system and associated methods, and that surfaces other than railroad components may be inspected. Accordingly, the disclosed inspection system and associated methods are not intended to be limited to railroad inspection or the measurable aspects and particular techniques described herein.

Figure 11:
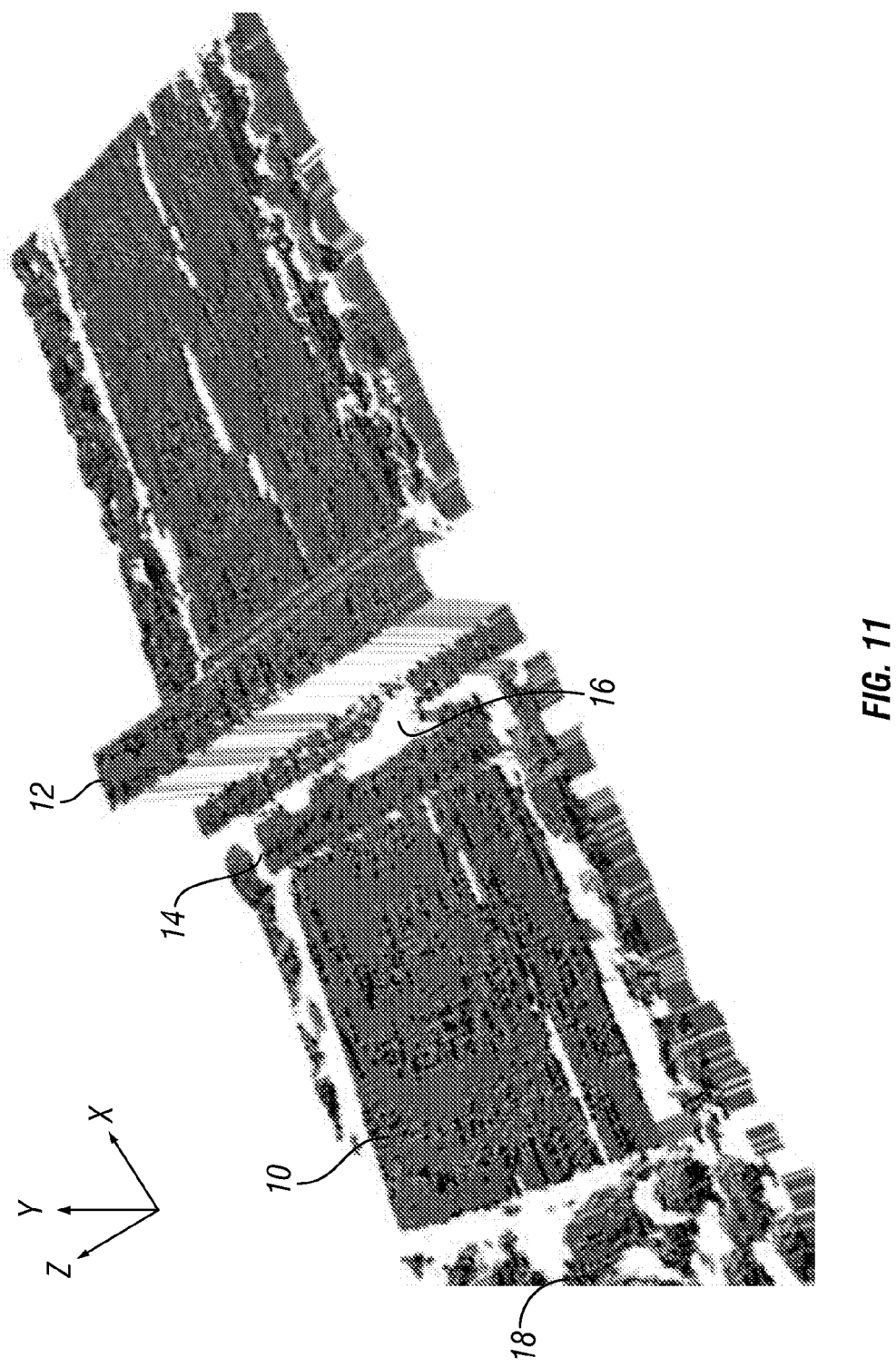
FIGS. 11 and 12 illustrate three-dimensional compilations of image data obtained with the disclosed inspection system.
Figure 12:
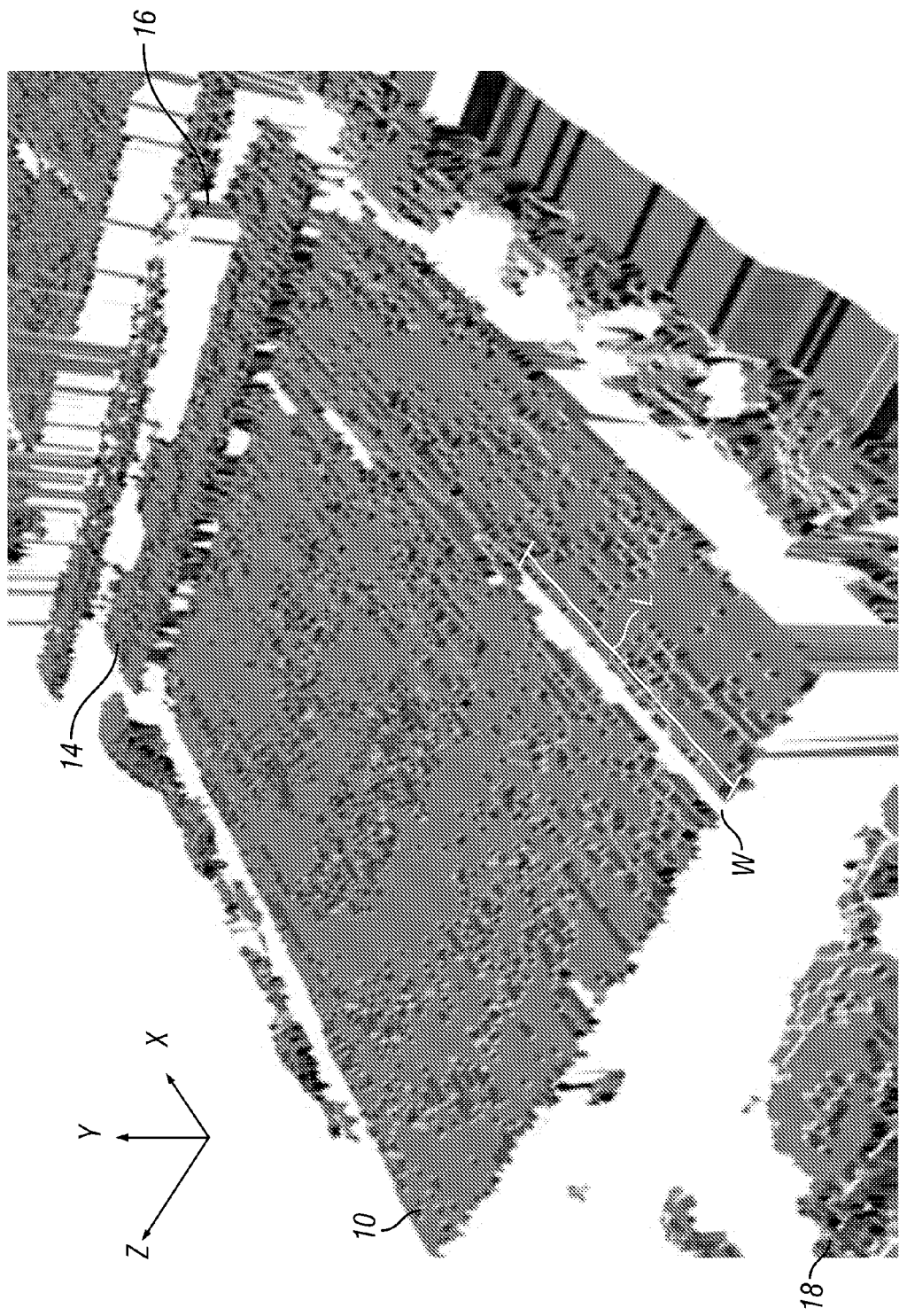

For clarity, FIGS. 11 and 12 illustrate example compilations of image data obtained with the disclosed inspection system and associated methods. FIG. 11 has a plurality of compiled image data showing a portion of a crosstie, tie plate, and rail in a perspective view. FIG. 12 has a plurality of compiled image data showing a more detailed perspective view. As can be seen in FIGS. 11-12, the compiled image data forms a three-dimensional representation (X, Y, and Z) of the area of the track bed. The representation has substantial detail, and various aspects of the components of the track bed can be measured. In FIGS. 11-12, for example, cracks or splits in the crosstie 10 are visible. Also, the height of the crosstie 10 with respect to the ballast layer 18 is visible. The orientation and heights of the tie plate 14 and rail 12 are visible. These and other details can be obtained with the disclosed inspection system and associated methods as described in more detail below.

Figure 4A:
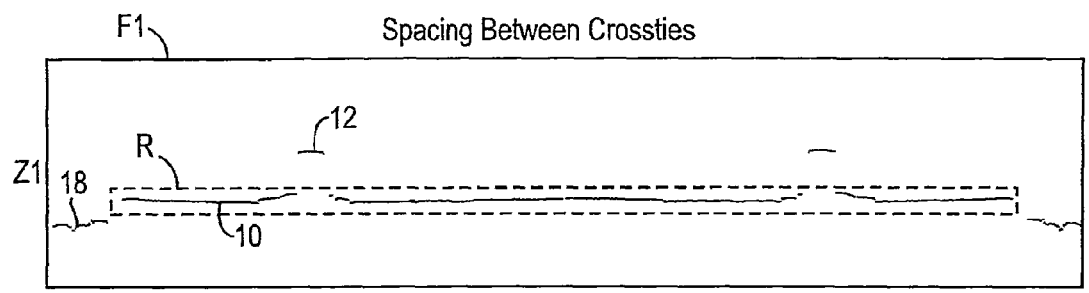
FIGS. 4A-4C illustrate example frames of railroad track obtained with the disclosed inspection system for determining the spacing between the crossties.
Figure 4B:
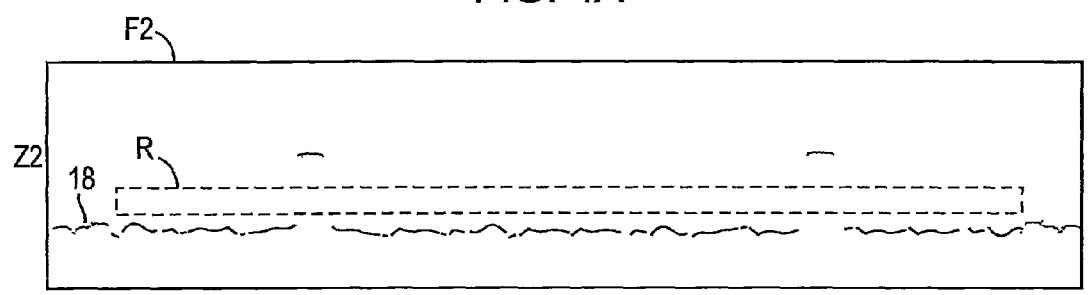
Figure 4C:
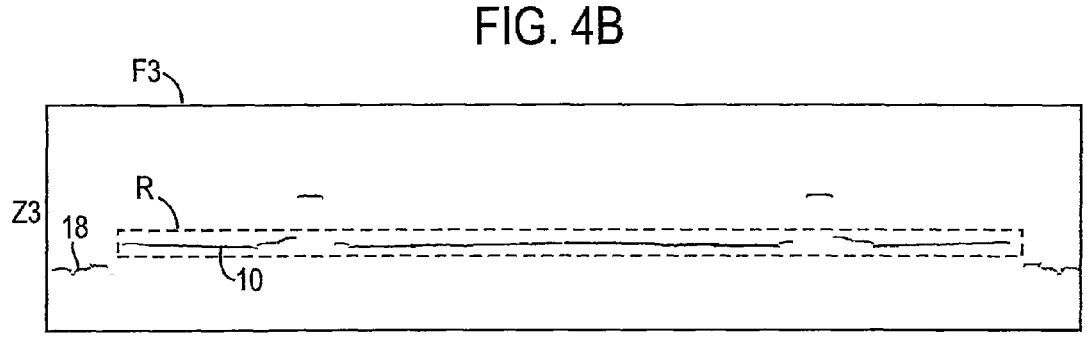

In one example, the spacing between crossties can be determined from the plurality of image data. Referring to FIGS. 4A-4C, example frames of the track bed obtained with the disclosed inspection system 30 are illustrated that can be used to determine the spacing between the crossties 10. FIG. 4A shows an end frame F1 having a contour of a first crosstie 10 that is at position Z1 along the track. This end frame F1 may designate the last frame showing this crosstie 10. FIG. 4B shows an intermediate frame F2 captured some time after the end frame F1 and at a further position Z2 along the track. This intermediate frame F2 lacks a crosstie because it designates a location between crossties of the track. It is understood that a plurality of such intermediate frames will follow the end frame F1 of FIG. 4A. FIG. 4C shows an end frame F3 having another crosstie 10' that is at further position Z3 along the track. Computer analysis can determine the spacing between crossties 10 and 10' by, for example, first counting the number of such intermediate frames F2 lacking a crosstie. This number of intermediate frames F2 can then be multiplied by the known spacing between frames (e.g., 0.1-inch) to calculate the distance between crossties 10 and 10'. In this way, a substantially accurate measurement between crossties of the track bed can be obtained without the need for a track inspector to physically inspect the crossties. Instead, the image data that forms the three-dimensional scan of the track bed is used.

Determining whether a frame has a crosstie or not can be performed by imaging techniques known in the art. For example and as shown in FIG. 4A-4C, the contour of a crosstie 10 is expected in a region of interest R of the frames F1-F3. Computer analysis can search the region of interest R of a frame for pixels indicating the presence of a crosstie. This can be done, for example, by averaging or summing the value of pixels in the region of interest R. Because the contour of the crosstie is composed of dark pixels, the region of interest R in a frame F1 having a crosstie 10 will have a greater average or sum than the region R in an intermediate frame F2 lacking a crosstie.

Figure 5:
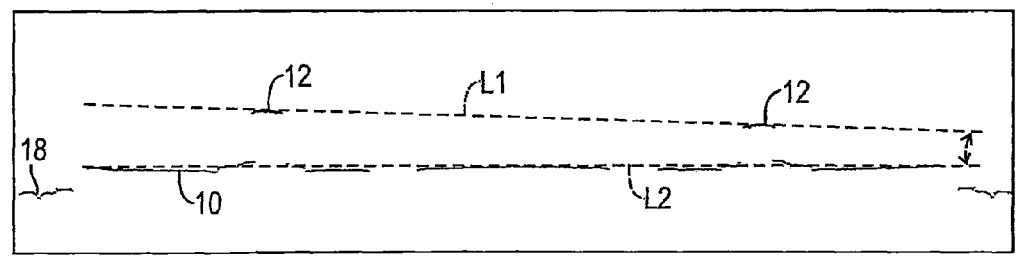
FIG. 5 illustrates an example frame of railroad track obtained with the disclosed inspection system for determining the angle of the crosstie with respect to the rail.

In another example, the angles of the crossties with respect to the rail can be determined from the image data. Referring to FIG. 5, an example frame of railroad track obtained with the disclosed inspection system is illustrated. The angular orientation of the heads of the rails 12 can be represented by a line L1. The line L1 can be estimated, for example, by best fit or curve fitting techniques known in the art. Similarly, the angular orientation of the crosstie 10 can be represented by a line L2. The line L2 can also be estimated, for example, by best fit or curve fitting techniques known in the art. These lines L1 and L2 can be averaged from several of the frames along the Z-axis near the crosstie 10. Computer analysis can then determine the angular relation between these lines L1-L2 to determine the angles of the ties with respect to rail.

This condition would indicate either worn rail or a plate cut condition on a wooden crosstie.

Figure 6A:
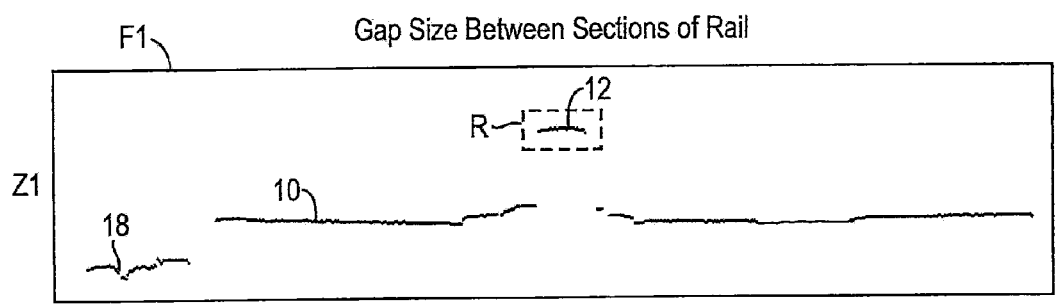
FIGS. 6A-6C illustrate example frames of railroad track obtained with the disclosed inspection system for determining a break or separation in the rail.
Figure 6B:
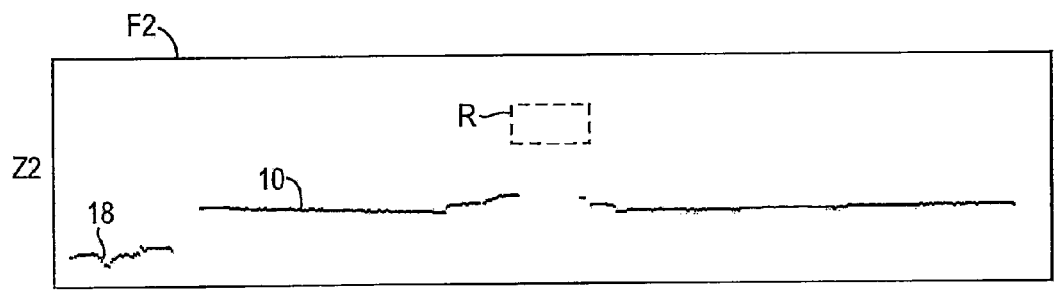
Figure 6C:
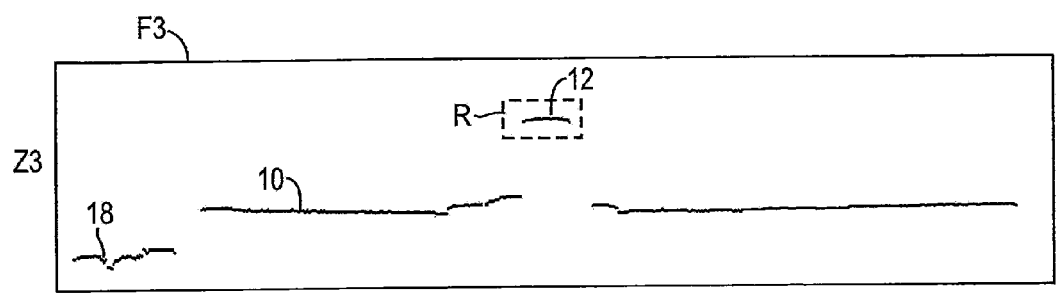

In another example, a break in the rail can be determined from the image data. Referring to FIGS. 6A-6C, example frames F1-F3 of railroad track obtained with the disclosed inspection system are illustrated that can be used to determine the separation of rail 12. FIG. 6A shows an end frame F1 having an end of a first rail 12 that is at position Z1 along the track, This end frame F1 designates the last frame showing this rail 12. FIG. 6B shows an intermediate frame F2 captured some time after the end frame F1 and at a further position Z2 along the track. This intermediate frame F2 lacks a rail because it represents a location between rails of the track. It is understood that a plurality of such intermediate frames F2 may follow the end frame F1 of FIG. 6A. FIG. 6C shows another end frame F3 having another rail 12' that is at further position Z3 along the track. Computer analysis can determine the spacing between the rails 12 and 12', for example, by first counting the number of intermediate frames F2 lacking a rail. This number of intermediate frames F2 can then be multiplied by the known spacing between frames (e.g., 0.1-inch) to calculate the distance between the rails 12 and 12'.

Determining whether a frame has a rail 12 or not can be performed by imaging techniques known in the art. For example and as shown in FIG. 6A-6C, the contour of a rail 12 is expected in a region of interest R of the frames F1-F3. Computer analysis can search the region of interest R of a frame for pixels indicating the presence of a rail contour. This can be done by averaging or summing the value of pixels in the region of interest, for example. Because the contour of the rail is composed of dark pixels, the region of interest R in a frame F1 having a rail 12 will have a greater average or sum than the region R in a frame F2 lacking a crosstie.

Figure 7A:
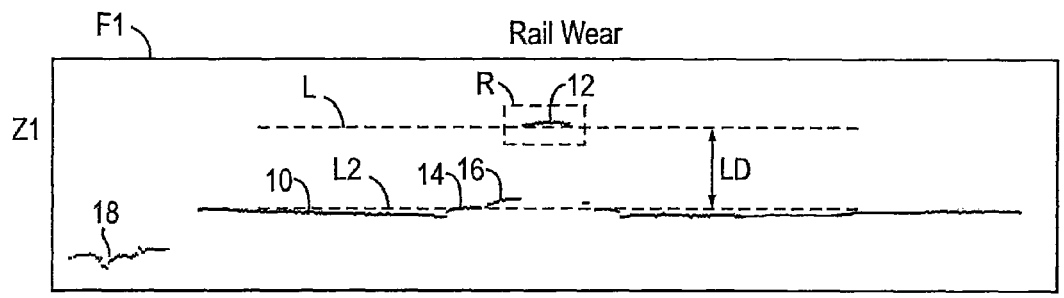
FIGS. 7A-7B illustrate example frames of railroad track obtained with the disclosed inspection system for determining wear of the rail.
Figure 7B:
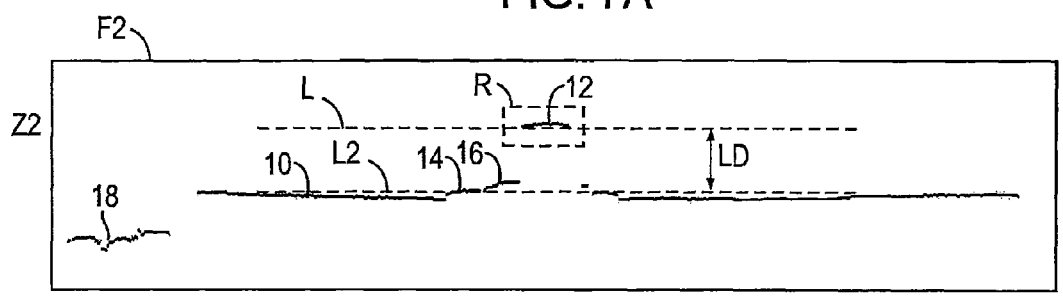

In another example, the wear of the rails can be determined from the image data. Referring to FIGS. 7A-7B, example frames F1-F2, of railroad track obtained with the disclosed inspection system, are illustrated and can be used to determine wear of the rail 12. Computer analysis can determine if a rail 12 has wear, for example, by determining whether the distance between the contour of the rail 12 and a reference point in a frame is less than the same distance in a prior frame. FIG. 7A shows a frame F1 having rail 12 that is at a position Z1 along the track. The contour of the rail 12 lies within a region of interest R and at a level L along the Y-axis of the frame F1. The contour of rail 12 is above a reference level L2, which may be the height of a tie plate, a measurable distance LD. As would be apparent to one of ordinary skill in the art having benefit of this disclosure, reference L2 may be located at a number of reference points such as tie plates 14, spikes 16, or crossties 10, for example. FIG. 7B shows another frame F2 at another position Z2 along the track. At position Z2, the distance LD is less between the contour of the rail 12 and level L2 than at position Z1. Thus, frame F2 may indicate wear of the rail 12 at the position Z2 along the track. As would be apparent to one of ordinary skill in the art having benefit of this disclosure, rail wear could also be determined comparing frames taken at different times, but at the same position along a track bed.

Figure 8:
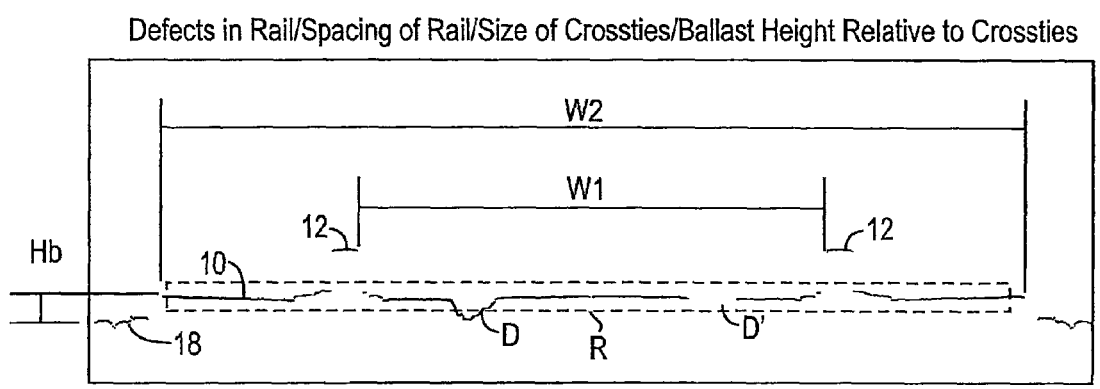
FIG. 8 illustrates an example frame of railroad track obtained with the disclosed inspection system for determining defects in the crosstie, spacing of the rail, size of the crossties, and ballast height relative to the crosstie.

In another example, the defects in the crossties 10 can be determined from the image data. As shown in FIG. 8, an example frame of railroad track obtained with the disclosed inspection system is shown. Defects D and D' are shown in the crosstie 10. Computer analysis can detect if the crosstie 10 has a defect, for example, by determining whether portions D of the contour of the cross tie lie outside a region of interest R or whether portions D' of the contour are absent within the region R. As is known, defects in a crosstie can include cracks, splits, or breaks in the ties. Using the plurality of image data near such a defect, computer analysis can determine the width and length of the defect. For example and as seen in FIGS. 11-12, the plurality of image data can be used to estimate the width W and length L of the crack shown in the edge of the crosstie. In some instances, the computer analysis can determine the depth of the defect, for example, when the orientation of the defect allows light from the laser to be projected within the defect and to be captured by the camera. In one embodiment, the angle between the laser and the camera can be relatively small so that the light projecting into a recessed defect can still be captured by the camera positioned almost parallel to the beam of laser light.

In another example, the spacing or gage of the rail or length of the crossties can be determined from the image data. In FIG. 8, an edge detecting technique known in the art can be used to find edges of the rail contours 12 in the frame, and the distance W1 between the edges can be calculated to estimate the spacing of the rails 12. Similarly, an edge detecting technique known in the art can be used to find edges of the crosstie contour 10 in the frame, and the distance W1 between the edges can be calculated to estimate the width W2 of the crosstie 10.

In another example, the height of ballast 18 relative to the crosstie 10 can be determined from the image data. In FIG. 8, a line fitting technique can determine the level of the ballast 18 and the level of the crosstie 10, and the difference between these levels can estimate the height $H_B$ of the ballast 18 relative to the crosstie 10. In another example, the scans of the railroad track can be used to determine the size of stones in the ballast 18. This can be done by analyzing a region of interest having ballast 18 and estimating sizes of the ballast stone using curvatures in the contour of the ballast 18.

Figure 9:
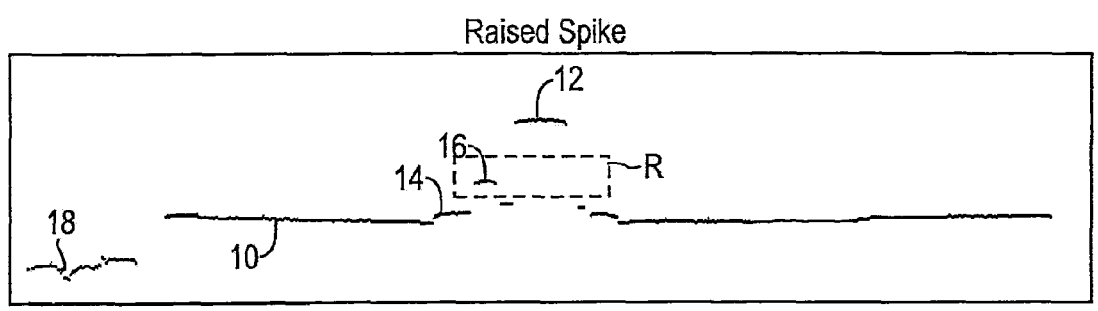
FIG. 9 illustrates an example frame of railroad track obtained with the disclosed inspection system for determining a raised spike.

In another example, raised spikes can be detected from the image data. Referring to FIG. 9, an example frame of railroad track obtained with the disclosed inspection system is illustrated. To determine whether there is a raised spike, a region of interest R can be analyzed to determine whether a portion of the contour representing a raised spike 16 occur within the region R.

Figure 10:
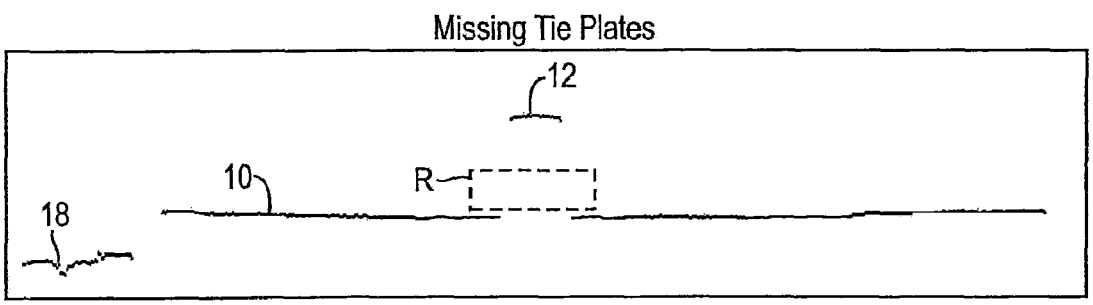
FIG. 10 illustrates an example frame of railroad track obtained with the disclosed inspection system for determining a missing tie plate.

In other examples, missing tie plates, misaligned tie plates, or sunken tie plates can be detected from the image data. Referring to FIG. 10, an example frame of railroad track obtained with the disclosed inspection system is illustrated. The missing or sunken tie plate can be detected, for example, by analyzing a region of interest R and determining whether a portion of the contour representing a tie plate occurs or does not occur within the region R. A misaligned tie plate can be determined by line fitting the portion of the contour of the tie plate and comparing the orientation of the line to that of the crosstie, for example.

In regards to FIG. 13, an alternative exemplary embodiment of inspection system 30 will now be described. In this embodiment, inspection system 30 may be constructed and operated in the same way as described in relation to the previous embodiments. However, in this embodiment, the present invention has been adapted to allow more efficient daylight operation. Inspection system 30 utilizes three line-generating lasers 40 mounted above the surface to be inspected. Center laser 40 is mounted in the center of framework 32 and scans the surface area within its angular spread β, while the outer two lasers 40 scan the outer periphery of the inspected surface within their angular spread β. If, for example, a railroad track were being inspected, center laser 40 could scan the full 9-foot tie, while the outer lasers would scan the rails.

In this exemplary embodiment, the two outer lasers 40 are each tilted outwardly away from the center laser at an approximate angle γ of 10 degrees. The two outer lasers 40 are tilted in this embodiment in order to allow the inspection system 30 to be stowed into a truck bed, for example, while still being capable of scanning a 9 foot tie of a railroad track bed. By tilting lasers 40 outward, the present invention achieves the scanning width required to inspect the ties, while still physically fitting within the trucks limit. However, since the present invention can also be used to inspect other surfaces, the two outer lasers 40 may not be tilted whatsoever dependent upon the practical requirements of that application.

Figure 13:
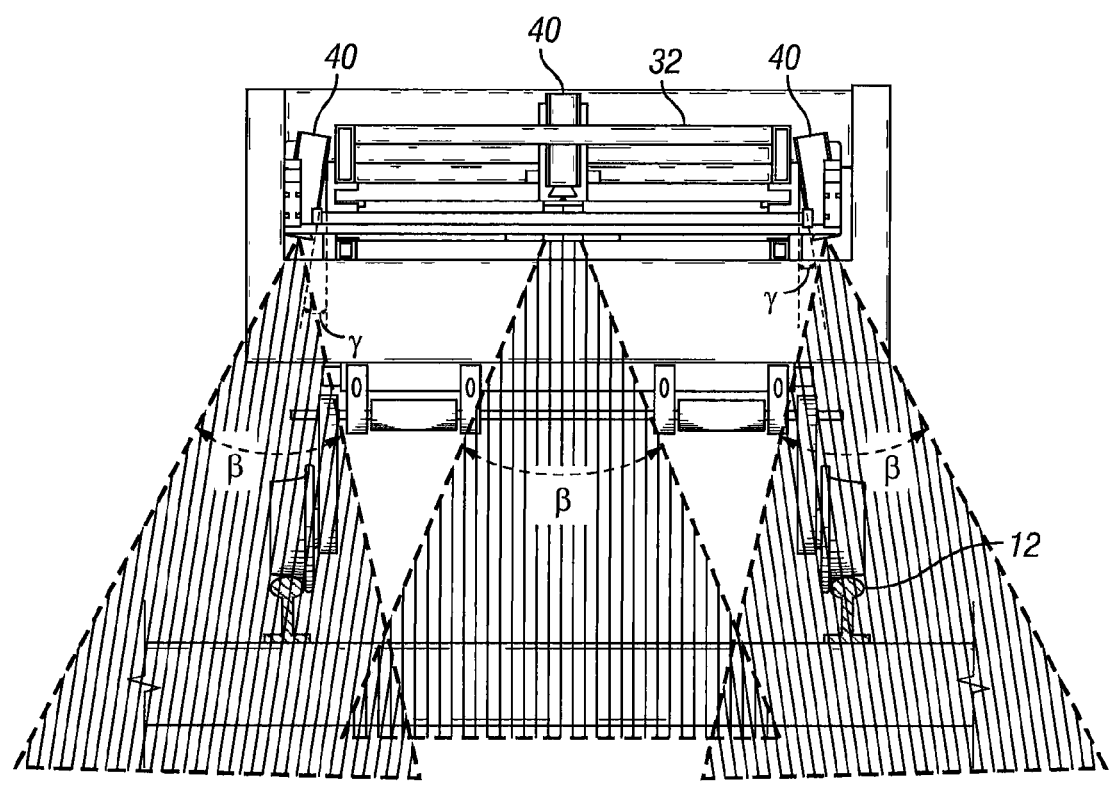
FIGS. 13 and 14 illustrate an alternate exemplary embodiment of the present invention.

Further referring to the exemplary embodiment of FIG. 13, lasers 40 are 7-watts lasers, each having a 45 degree angular spread β. However, angular spread β could be more or less depending upon the distance between lasers 40 and the inspected surface as understood by those skilled in the art having the benefit of this disclosure. The intensity of the laser line L (i.e., laser beam L) projected by lasers 40 onto the inspected surface is at least 0.15 watts per inch of the width of laser line L projected onto the surface. In the most preferred embodiment, the intensity is 0.18 watts per inch of the width of laser line L projected onto the surface. The number of lasers 40 utilized may be more or less than three, as long as the number utilized can provide the necessary wattage per inch of laser line L. Accordingly, those ordinarily skilled in this art having the benefit of this disclosure realize there are a variety of laser combinations which could provide this minimum wattage.

Figure 16:
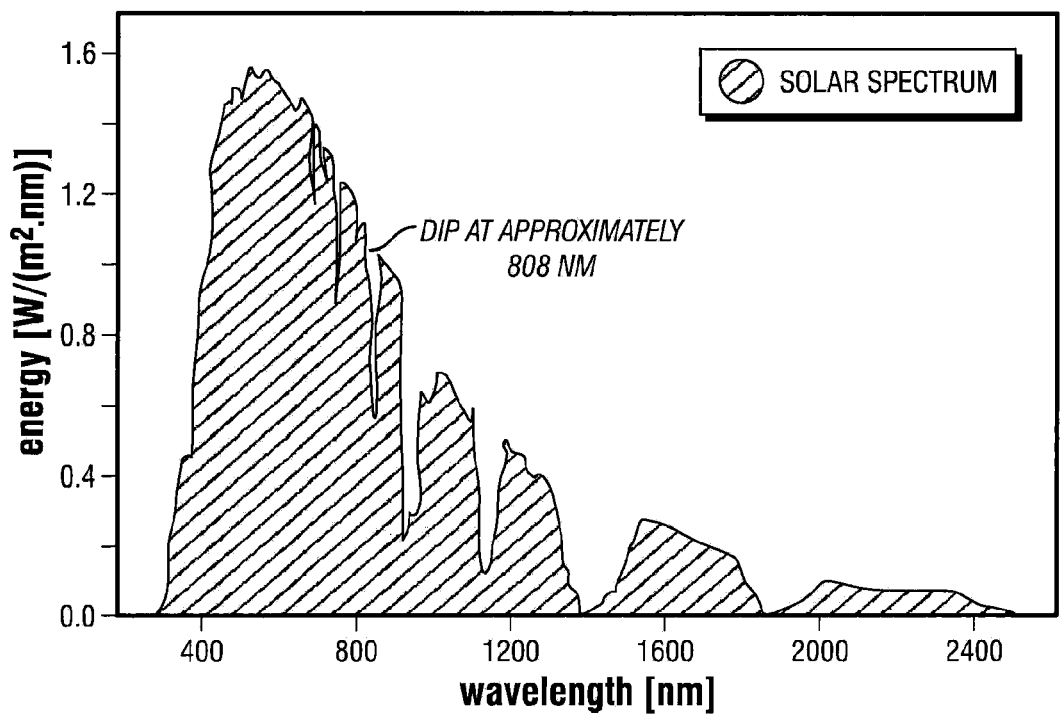
FIG. 16 illustrates a graph plotting the energy of the sun's solar radiation at specific wavelengths according to an exemplary embodiment of the present invention.

Further referring to the exemplary embodiment of FIG. 13, the combined use of the three lasers 40 provides a higher light intensity, thereby producing a line of light at a specific wavelength which is more intense than the solar radiation at that same wavelength. In this exemplary embodiment, lasers 40 are each 808 nm+/−2 nm wavelength lasers as understood in the art. This choice of laser wavelength corresponds to a dip in the solar spectrum at approximately 808 nm caused by the sunlight penetrating the earth's atmosphere, as illustrated in the graph of FIG. 16. Here, the solar spectrum is shown at sea level ranging from roughly 400 nm to above 2400 nm, which includes UV, visible and infrared wavelengths. At approximately 808 nm, there is a sharp dip in sun's solar energy. Thus, the 808 nm lasers utilized in the present invention were specifically chosen because their wavelengths at approximately 808 nm are more intense than the solar radiation at the same wavelength, thereby allowing their radiated light to be detected in sunlight via cameras 50. Those ordinarily skilled in the art having the benefit of this disclosure realize other laser wavelengths may be utilized to take advantage of other dips in solar radiation, in accordance with the present invention.

Figure 14:
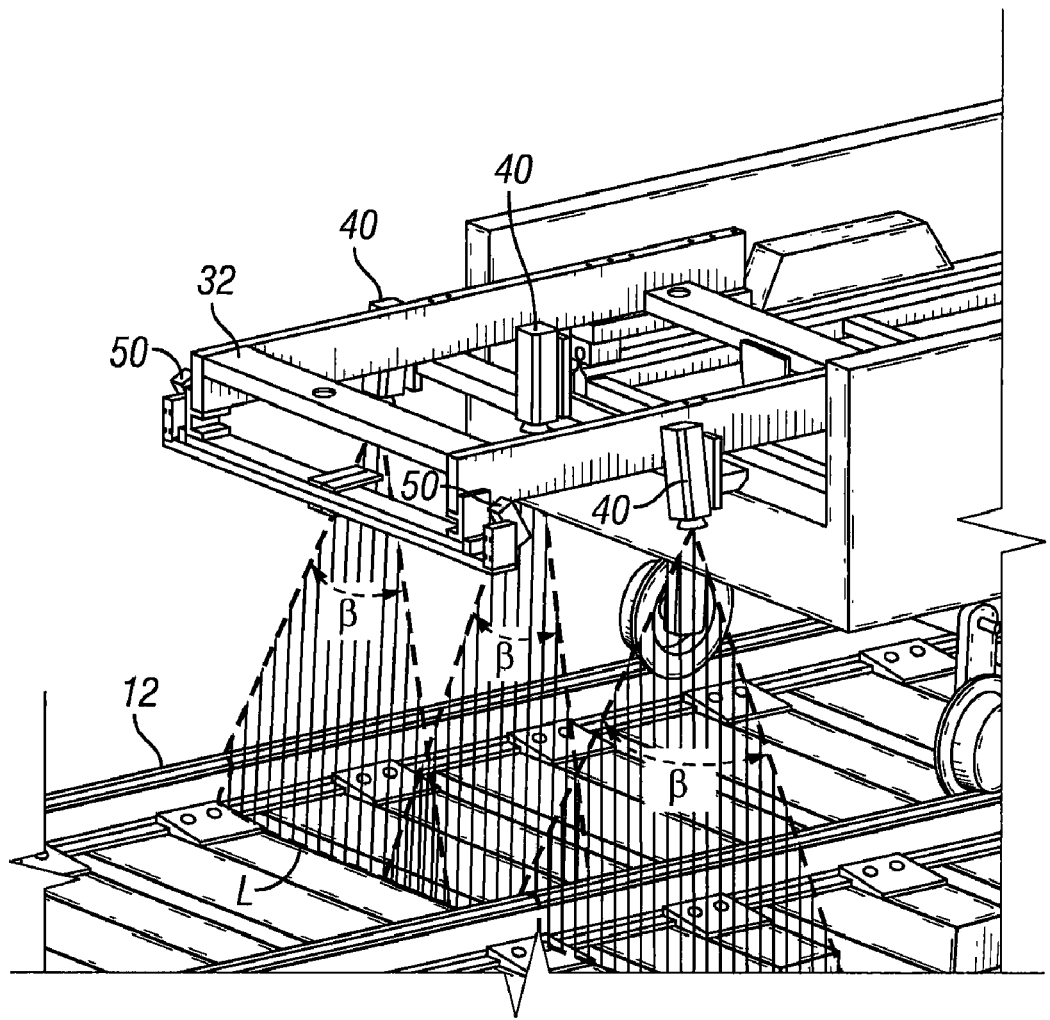
Figure 15:
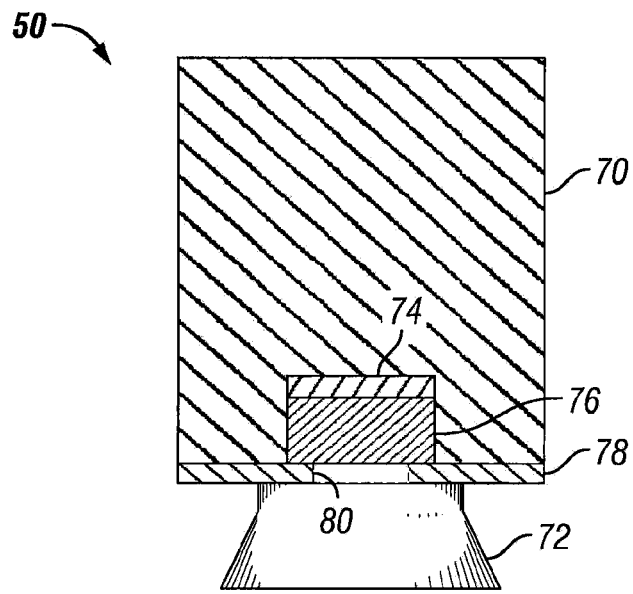
FIG. 15 illustrates an exemplary embodiment of a camera according to the present invention.

Referring to FIGS. 14 and 15, an exemplary alternative embodiment of cameras 50 of the present invention will now be described. As previously discussed, cameras 50 are mounted to framework 32 and send image data of the inspected surface (in this example, a railroad track) to the processing device or computer 60 via wired or wireless transmission lines. However, in this exemplary embodiment, cameras 50 each include a housing 70 having a lens 72. Within housing 70 is a charge coupled device 74, or CCD, which is an analog shift register that enables transmission of analog signals through successive stages controlled by a clock signal. CCD 74 can be used as a form of memory or for delaying samples of analog signals, as understood in the art. In the alternative, however, a CMOS sensor as understood in the art may be utilized to capture images as well. Those ordinarily skilled in the art having the benefit of this disclosure realize there are a variety of cameras which may be utilized with the present invention.

As illustrated in FIG. 15, CCD 74 is placed adjacent an optical bandpass filter 76. In this exemplary embodiment, bandpass filter 76 was chosen to pass a band of the laser 40's wavelength −2 nm and +1 nm, while filtering at least OD4 for the remainder of camera 50's response range from 300 nm to 1100 nm, excluding the ramp-up and ramp-down areas that exist near the band pass region as understood by those ordinarily skilled in the art having the benefit of this disclosure. Therefore, by utilizing 808 nm lasers, bandpass filter 76 passes a wavelength approximately 806-810 nm, while filtering out the remaining solar radiation. Since there is a dip in the sun's radiation at this wavelength, the line generated by lasers 40 is readily detectable in the sunlight.

In order to reduce the blue shift associated with light passing through a filter at an angle, bandpass filter 76 is mounted between lens 72 and CCD 74. Typically, when light passes through a filter at extreme angles, in order to get the same wavelength of light at many different angles, you must have a filter with a wide passband. If a filter were placed on the exterior of the lens, light would come in at an extreme angle. However, by moving the filter behind the lens, the light is much more parallel and the blue shift effect is dramatically decreased. This reduction in the blue shift results in a much tighter filter bandpass, which is necessary to filter out as much solar radiation as possible. Accordingly, bandpass filter 76 is mounted behind lens 72.

A spacer 78 is positioned on the other side of bandpass filter 76 opposite CCD 74. Spacer 76 comprises an opening 80 which allows image data to be collected from lens 72. In this embodiment, bandpass filter 76 screens out as much nonlaser-generated light as possible, thereby enabling daytime inspection. Also, this embodiment results in a slight increase in focal length due to the light passing through filter 76. This phenomenon is compensated for by mounting CCD 74 slightly further from lens 72 via the use of spacer 78 located between lens 72 and camera housing 70. Spacer 78 changes the orientation of the lens 72 relative to CCD 74. Spacer 78 may be, for example, a precision shim washer. In the alternative, however, spacer 78 would not be necessary in embodiments utilizing a camera lens which has a sufficiently wide focusing range. Accordingly, those ordinarily skilled in the art having the benefit of this disclosure realize there are a variety of spacers which could be utilized with the present invention, and that the need for spacer 78 may be negated through lens choice.

According to an exemplary embodiment, the present invention includes a system for inspecting a surface, the system comprising at least one light generator positioned adjacent the surface, the light generator adapted to project a beam of light across the surface, the beam of light totaling at least 0.15 watts of intensity per inch of a width of the beam of light; at least one camera positioned adjacent the surface for receiving at least a portion of the light reflected from the surface and for generating at least one image representative of a profile of at least a portion of the surface, the camera comprising a bandpass filter adapted to pass a band of the beam of light projected by the light generator, the band corresponding to a dip in solar radiation; and at least one processor adapted to analyze the at least one image and determine one or more physical characteristics of the portion of the surface. In an exemplary embodiment, the angular spread of the beam of light projected by the generator is 45 degrees.

In an alternative embodiment of this system, the light generator comprises a center laser; and two outer lasers located on opposites sides of the center laser, the two outer lasers each being tilted outwardly from the center laser at a 10 degree angle. In the alternate, the light generator is a 808 nm laser. In yet another embodiment, the camera comprises a lens; a spacer positioned adjacent the lens; and a charge coupled device, the bandpass filter being coupled between the charge coupled device and the spacer. The bandpass filter is located behind a lens of the camera.

In yet another alternative embodiment of this system, the surface is a railroad track bed and the processor comprises an algorithm for determining a distance between crossties of the railroad track bed, the algorithm comprising the steps of (a) analyzing a first frame, one or more intermediate frames and an end frame of the at least one image, the first and end frames comprising crossties while the one or more intermediate frames lack crossties; (b) determining a number of the one or more intermediate frames lacking crossties; (c) determining a known spacing between frames; and (d) determining the distance between the crossties of the first and end frames based upon the number of the one or more intermediate frames lacking crossties and the known spacing between the frames.

In an alternative embodiment of this system, the surface is a railroad track bed and the processor comprises an algorithm for detecting a misaligned or sunken tie plate of the railroad track bed, the algorithm comprising the steps of: (a) analyzing a frame of the at least one image, the frame comprising a region of interest; (b) determining whether the region of interest contains a tie plate; (c) if a tie plate is present, determining a crosstie contour and a tie plate contour; (d) comparing an orientation of the crosstie contour and an orientation of the tie plate contour; and (e) determining whether the tie plate is misaligned or sunken based upon the comparison.

In yet another alternative embodiment of this system, the surface is a railroad track bed and the processor comprises an algorithm for identifying a break in a rail of the railroad track bed, the algorithm comprising the steps of: (a) analyzing a first frame, one or more intermediate frames and an end frame of the at least one image, the first and end frames comprising rails while the one or more intermediate frames lack rails; (b) determining a number of the one or more intermediate frames lacking rails; (c) determining a known spacing between frames; and (d) identifying the break in the rail based upon the number of the one or more intermediate frames lacking rails and the known spacing between the frames. In yet another embodiment, the surface comprises one or more of a road, plant, building foundation, automobile bridge or sidewalk.

An exemplary method of the present invention comprises the steps of: (a) illuminating a light across the span of the surface, the light totaling a combined intensity of at least 0.15 watts of intensity per inch of a width of the light; (b) receiving at least a portion of the light reflected from the surface using one or more cameras, the one or more cameras comprising a bandpass filter adapted to pass only a band of the reflected light, the band corresponding to a dip in solar radiation; (c) generating at least one image representative of a profile of at least a potion of the surface; (d) analyzing the at least one image; (e) determining one or more physical characteristics of the portion of the surface; and (f) outputting the determined physical characteristics of the portion of the surface. In yet another exemplary method, step (a) comprises the step of projecting a plurality of beams of light to form the light illuminated across the surface, the plurality of beams of light each having an angular spread of 45 degrees.

In an alternative method, the plurality of beams of light comprise a center beam and two outer beams on opposite sides of the center beam, step (a) further comprising the step of projecting the two outer beams outwardly from the center beam at a 10 degree angle. In another method, the light illuminated across the span of the surface is created using 808 nm lasers.

In yet another exemplary method, the surface may be a railroad track bed, the method further comprising the step of determining a distance between crossties of the railroad track bed, the step of determining the distance comprising the steps of: (a) analyzing a first frame, one or more intermediate frames and an end frame of the at least one image, the first and end frames comprising crossties while the one or more intermediate frames lack crossties; (b) determining a number of the one or more intermediate frames lacking crossties; (c) determining a known spacing between frames; and (d) determining the distance between the crossties of the first and end frames based upon the number of the one or more intermediate frames lacking crossties and the known spacing between the frames.

In yet another method, the surface is a railroad track bed, the method further comprises the step of identifying a break in a rail of the railroad track bed, the step of identifying comprising the steps of: (a) analyzing a first frame, one or more intermediate frames and an end frame of the at least one image, the first and end frames comprising rails while the one or more intermediate frames lack rails; (b) determining a number of the one or more intermediate frames lacking rails; (c) determining a known spacing between frames; and (d) identifying the break in the rail based upon the number of the one or more intermediate frames lacking rails and the known spacing between the frames.

In this exemplary method, the surface may be a railroad track bed, the method further comprising the step of detecting a misaligned or sunken tie plate of the railroad track bed, the step of detecting comprising the steps of: (a) analyzing a frame of the at least one image, the frame comprising a region of interest; (b) determining whether the region of interest contains a tie plate; (c) if a tie plate is present, determining a crosstie contour and a tie plate contour; (d) comparing an orientation of the crosstie contour and an orientation of the tie plate contour; and (e) determining whether the tie plate is misaligned or sunken based upon the comparison.

Yet another alternate method of the present invention comprises the steps of: (a) projecting a light onto the surface, the light having an intensity of at least 0.15 watts of intensity per inch of a width of the light; (b) receiving at least a portion of the light reflected from the surface into a receiver; (c) utilizing a bandpass filter of the receiver to pass a band of the reflected light which corresponds to a dip in solar radiation, wherein the reflected light is adapted to be more intense than the solar radiation at the dip; (d) utilizing the passed band of the reflected light to generate one or more images representative of a profile of at least a portion of the surface; (e) determining one or more characteristics of the portion of the surface; and (f) outputting the determined characteristics of the portion of the surface. In an alternative method, step (a) further comprises the step of projecting a plurality of beams of light to form the light projected onto the surface, the plurality of beams of light each having an angular spread of 45 degrees. In yet another exemplary method, the plurality of beams of light comprise a center beam and two outer beams on opposite sides of the center beam, step (a) further comprising the step of projecting the two outer beams outwardly from the center beam at a 10 degree angle.

In the alternative, the surface may be a railroad track bed, the method further comprising the step of determining a distance between crossties of the railroad track bed, the step of determining the distance comprising the steps of: (a) analyzing a first frame, one or more intermediate frames and an end frame of the one or more images, the first and end frames comprising crossties while the one or more intermediate frames lack crossties; (b) determining a number of the one or more intermediate frames lacking crossties; (c) determining a known spacing between frames; and (d) determining the distance between the crossties of the first and end frames based upon the number of the one or more intermediate frames lacking crossties and the known spacing between the frames.

In yet another alternative method, the surface may be a railroad track bed, the method further comprising the step of identifying a break in a rail of the railroad track bed, the step of identifying comprising the steps of: (a) analyzing a first frame, one or more intermediate frames and an end frame of the one or more images, the first and end frames comprising rails while the one or more intermediate frames lack rails; (b) determining a number of the one or more intermediate frames lacking rails; (c) determining a known spacing between frames; and (d) identifying the break in the rail based upon the number of the one or more intermediate frames lacking rails and the known spacing between the frames.

In yet another alternative method, the surface may be a railroad track bed, the method further comprising the step of detecting a misaligned or sunken tie plate of the railroad track bed, the step of detecting comprising the steps of: (a) analyzing a frame of one or more images, the frame comprising a region of interest; (b) determining whether the region of interest contains a tie plate; (c) if a tie plate is present, determining a crosstie contour and a tie plate contour; (d) comparing an orientation of the crosstie contour and an orientation of the tie plate contour; and (e) determining whether the tie plate is misaligned or sunken based upon the comparison.

Although various embodiments have been shown and described, the invention is not so limited and will be understood to include all such modifications and variations as would be apparent to one skilled in the art. For example, although the embodiments disclosed herein have been applied to railroad track beds, the present invention may also be utilized to inspect a variety of other surfaces such as roads, side walks, tree/forests, crops, bridges, building foundations, cars moving down the highway underneath an inspection system, or any variety of 3-D shapes one may desire to inspect and/or measure. Accordingly, the invention is not to be restricted except in light of the attached claims and their equivalents.

We claim:

1. A system for inspecting a railroad track bed, the system comprising:
   at least one light generator positioned adjacent the railroad track bed, the light generator adapted to project a beam of light across the railroad track bed, the beam of light having an intensity totaling at least 0.15 watts per inch of a width of the beam of light;
   at least one camera positioned adjacent the railroad track bed for receiving at least a portion of the light reflected from the railroad track bed and for generating at least one image representative of a profile of at least a portion of the railroad track bed, the camera comprising a bandpass filter adapted to pass a band of the beam of light projected by the light generator, the band corresponding only to a natural intensity dip in a spectrum of ground-level solar radiation; and
   at least one processor adapted to analyze the at least one image and determine one or more physical characteristics of the portion of the railroad track bed, the processor comprising an algorithm configured for determining a distance between crossties of the railroad track bed, the algorithm comprising the steps of:
   (a) analyzing a first frame, one or more intermediate frames and an end frame of the at least one image, the first and end frames comprising crossties, while the one or more intermediate frames lack crossties;
   (b) determining a number of the one or more intermediate frames lacking crossties;
   (c) determining a known spacing between frames; and
   (d) determining the distance between the crossties of the first and end frames based upon the number of the one or more intermediate frames lacking crossties and the known spacing between the frames.

2. A system as defined in claim 1, wherein an angular spread of the beam of light projected by the generator is 45 degrees.

3. A system as defined in claim 1, wherein the light generator comprises: a center laser; and two outer lasers located on opposites sides of the center laser, the two outer lasers each being tilted outwardly from the center laser at a 10 degree angle.

4. A system as defined in claim 1, wherein the light generator is a 808 nm laser.

5. A system as defined in claim 1, wherein the camera further comprises: a lens; a spacer positioned adjacent the lens; and a charge coupled device, the bandpass filter being coupled between the charge coupled device and the spacer.

6. A system as defined in claim 1, wherein the bandpass filter is located behind a lens of the camera.

7. A system for inspecting a railroad track bed, comprising:
   at least one light generator positioned adjacent the railroad track bed, the light generator adapted to project a beam of light across the railroad track bed, the beam of light having an intensity totaling at least 0.15 watts per inch of a width of the beam of light;
   at least one camera positioned adjacent the railroad track bed for receiving at least a portion of the light reflected from the railroad track bed and for generating at least one image representative of a profile of at least a portion of the railroad track bed, the camera comprising a bandpass filter adapted to pass a band of the beam of light projected by the light generator, the band corresponding only to a natural intensity dip in a spectrum of ground-level solar radiation; and
   at least one processor adapted to analyze the at least one image and determine one or more physical characteristics of the portion of the railroad track bed, the processor comprising an algorithm for detecting a misaligned or sunken tie plate of the railroad track bed, the algorithm comprising the steps of:
   (a) analyzing a frame of the at least one image, the frame comprising a region of interest;
   (b) determining whether the region of interest contains a tie plate;
   (c) if a tie plate is present, determining a crosstie contour and a tie plate contour;
   (d) comparing an orientation of the crosstie contour and an orientation of the tie plate contour; and
   (e) determining whether the tie plate is misaligned or sunken based upon the comparison.

8. A system as defined in claim 7, wherein the light generator comprises a plurality of lasers.

9. A system as defined in claim 7, wherein the light generator is a 808 nm laser.

10. A system as defined in claim 7, wherein the camera further comprises:
    a lens;
    a spacer positioned adjacent the lens; and a charge coupled device, the bandpass filter being coupled between the charge coupled device and the spacer.

11. A system as defined in claim 7, wherein the bandpass filter is located behind a lens of the camera.

12. A method for inspecting a railroad track bed, the method comprising the steps of:
   (a) illuminating a light across the span of the railroad track bed, the light totaling a combined intensity of at least 0.15 watts per inch of a width of the light;
   (b) receiving at least a portion of the light reflected from the railroad track bed using one or more cameras, the one or more cameras comprising a bandpass filter adapted to pass only a band of the reflected light, the band corresponding only to a natural intensity dip in a spectrum of ground-level solar radiation;
   (c) generating at least one image representative of a profile of at least a portion of the railroad track bed;
   (d) analyzing the at least one image;
   (e) determining one or more physical characteristics of the portion of the railroad track bed;
   (f) outputting the determined physical characteristics of the portion of the railroad track bed;
   (g) determining a distance between crossties of the railroad track bed by the steps of:
   (h) analyzing a first frame, one or more intermediate frames and an end frame of the at least one image, the first and end frames comprising crossties while the one or more intermediate frames lack crossties;
   (i) determining a number of the one or more intermediate frames lacking crossties;
   (j) determining a known spacing between frames; and
   (k) determining the distance between the crossties of the first and end frames based upon the number of the one or more intermediate frames lacking crossties and the known spacing between the frames.

13. A method as defined in claim 12, wherein step (a) comprises the step of projecting a plurality of beams of light to form the light illuminated across the surface, the plurality of beams of light each having an angular spread of 45 degrees.

14. A method as defined in claim 13, wherein the plurality of beams of light comprise a center beam and two outer beams on opposite sides of the center beam, step (a) further comprising the step of projecting the two outer beams outwardly from the center beam at a 10 degree angle.

15. A method as defined in claim 12, wherein the light illuminated across the span of the surface is created using 808 nm lasers.

16. A method for inspecting a railroad track bed, comprising the steps of:
   (a) illuminating a light across the span of the railroad track bed, the light totaling a combined intensity of at least 0.15 watts per inch of a width of the light;
   (b) receiving at least a portion of the light reflected from the railroad track bed using one or more cameras, the one or more cameras comprising a bandpass filter adapted to pass only a band of the reflected light, the band corresponding only to a natural intensity dip in a spectrum of ground-level solar radiation;
   (c) generating at least one image representative of a profile of at least a portion of the railroad track bed;
   (d) analyzing the at least one image;
   (e) determining one or more physical characteristics of the portion of the railroad track bed;
   (f) detecting a misaligned or sunken tie plate of the railroad track bed, the step of detecting comprising the steps of:
   (g) analyzing a frame of the at least one image, the frame comprising a region of interest;
   (h) determining whether the region of interest contains a tie plate;
   (i) if a tie plate is present, determining a crosstie contour and a tie plate contour;
   (j) comparing an orientation of the crosstie contour and an orientation of the tie plate contour; and
   (k) determining whether the tie plate is misaligned or sunken based upon the comparison.

17. A method as defined in claim 16, wherein step (a) comprises the step of projecting a plurality of beams of light to form the light illuminated across the railroad track bed.

18. A method as defined in claim 16, wherein the light illuminated across the span of the railroad track bed is created using 808 nm lasers.

19. A method for inspecting a railroad track bed, the method comprising the steps of:
   (a) projecting a light onto the railroad track bed, the light having an intensity of at least 0.15 watts per inch of a width of the light;
   (b) receiving at least a portion of the light reflected from the railroad track bed into a receiver;
   (c) utilizing a bandpass filter of the receiver to pass a band of the reflected light which corresponds only to a natural intensity dip in a spectrum of ground-level solar radiation, wherein the reflected light is adapted to be more intense than the solar radiation at the dip;
   (d) utilizing the passed band of the reflected light to generate one or more images representative of a profile of at least a portion of the railroad track bed;
   (e) determining one or more characteristics of the portion of the railroad track bed;
   (f) outputting the determined characteristics of the portion of the railroad track bed;
   (g) determining a distance between crossties of the railroad track bed by the steps of:
   (h) analyzing a first frame, one or more intermediate frames and an end frame of the one or more images, the first and end frames comprising crossties while the one or more intermediate frames lack crossties;
   (i) determining a number of the one or more intermediate frames lacking crossties;
   (j) determining a known spacing between frames; and
   (k) determining the distance between the crossties of the first and end frames based upon the number of the one or more intermediate frames lacking crossties and the known spacing between the frames.

20. A method as defined in claim 19, wherein step (a) further comprises the step of projecting a plurality of beams of light to form the light projected onto the surface, the plurality of beams of light each having an angular spread of 45 degrees.

21. A method as defined in claim 20, wherein the plurality of beams of light comprise a center beam and two outer beams on opposite sides of the center beam, step (a) further comprising the step of projecting the two outer beams outwardly from the center beam at a 10 degree angle.

22. A method for inspecting a railroad track bed, comprising the steps of:
   (a) projecting a light onto the railroad track bed, the light having an intensity of at least 0.15 watts per inch of a width of the light;
   (b) receiving at least a portion of the light reflected from the railroad track bed into a receiver;
   (c) utilizing a bandpass filter of the receiver to pass a band of the reflected light which corresponds only to a natural intensity dip in a spectrum of ground-level solar radiation, wherein the reflected light is adapted to be more intense than the solar radiation at the dip;

(d) utilizing the passed band of the reflected light to generate one or more images representative of a profile of at least a portion of the railroad track bed;

(e) determining one or more characteristics of the portion of the railroad track bed;

(f) outputting the determined characteristics of the portion of the railroad track bed;

(g) detecting a misaligned or sunken tie plate of the railroad track bed, the step of detecting comprising the steps of:

(h) analyzing a frame of one or more images, the frame comprising a region of interest;

(i) determining whether the region of interest contains a tie plate;

(j) if a tie plate is present, determining a crosstie contour and a tie plate contour;

(k) comparing an orientation of the crosstie contour and an orientation of the tie plate contour; and (l) determining whether the tie plate is misaligned or sunken based upon the comparison.

23. A method as defined in claim 22, wherein step (a) further comprises the step of projecting a plurality of beams of light to form the light projected onto the surface.

* * * * *